(12) United States Patent
Mavinahally et al.

(10) Patent No.: US 8,534,268 B2
(45) Date of Patent: Sep. 17, 2013

(54) TWO-STROKE ENGINE

(76) Inventors: Nagesh Mavinahally, Northridge, CA (US); Jay S. Veerathappa, Northridge, CA (US)

( * ) Notice: Subject to any disclaimer, the term of this patent is extended or adjusted under 35 U.S.C. 154(b) by 435 days.

(21) Appl. No.: 12/880,047

(22) Filed: Sep. 10, 2010

(65) Prior Publication Data

US 2011/0061636 A1 Mar. 17, 2011

Related U.S. Application Data

(60) Provisional application No. 61/276,584, filed on Sep. 14, 2009.

(51) Int. Cl.
*F02P 3/04* (2006.01)

(52) U.S. Cl.
USPC ........................................................ 123/650

(58) Field of Classification Search
USPC ........................................................ 123/650
See application file for complete search history.

(56) References Cited

U.S. PATENT DOCUMENTS

| | | | |
|---|---|---|---|
| 980,134 A | 12/1910 | Springer | |
| 1,346,066 A * | 7/1920 | Spuhler | 123/73 AA |
| 4,711,201 A * | 12/1987 | Ooyama et al. | 123/73 A |
| 4,821,787 A | 4/1989 | Swanson | |
| 4,829,940 A * | 5/1989 | Okazaki et al. | 123/41.39 |
| 5,425,346 A | 6/1995 | Mavinahally | |
| 6,085,703 A * | 7/2000 | Noguchi | 123/73 R |
| 6,112,708 A | 9/2000 | Sawada et al. | |
| 6,152,093 A * | 11/2000 | Sawada et al. | 123/73 PP |
| 6,289,856 B1 | 9/2001 | Noguchi | |
| 6,367,432 B1 * | 4/2002 | Araki | 123/73 R |
| 6,497,204 B1 | 12/2002 | Miyazaki et al. | |
| 6,564,760 B2 * | 5/2003 | Laydera-Collins | 123/73 AA |
| 6,591,792 B2 * | 7/2003 | Nemoto et al. | 123/73 PP |
| 6,895,910 B2 | 5/2005 | Geyer et al. | |
| 6,941,906 B2 * | 9/2005 | Carlsson et al. | 123/73 PP |
| 6,973,899 B2 * | 12/2005 | Warfel et al. | 123/73 PP |
| 7,025,021 B1 | 4/2006 | Andersson et al. | |
| 7,331,315 B2 | 2/2008 | Mavinahally | |
| 7,363,888 B2 | 4/2008 | Klimmek et al. | |
| 7,536,983 B2 | 5/2009 | Layher et al. | |
| 7,559,299 B2 | 7/2009 | Brower et al. | |
| 2005/0139179 A1 * | 6/2005 | Mavinahally et al. | 123/73 A |
| 2006/0243230 A1 | 11/2006 | Mavinahally et al. | |
| 2007/0157913 A1 * | 7/2007 | Fattorusso | 123/73 PP |
| 2010/0018507 A1 * | 1/2010 | Froese | 123/545 |
| 2010/0145595 A1 | 6/2010 | Bellistri et al. | |

OTHER PUBLICATIONS

Efco, our power, your passion; Web Page: http://www.efcopower.com/indexPri.jsp, Sep. 10, 2010.

* cited by examiner

*Primary Examiner* — Thanh K Truong
*Assistant Examiner* — Charles Brauch
(74) *Attorney, Agent, or Firm* — Geoffrey Gelman

(57) ABSTRACT

A two-stroke internal combustion engine includes at least one gaseous communication charge passage between a crankcase chamber and a combustion chamber of the engine and a piston to open and close the top end of the transfer passage. The air inlet port to the transfer passage for stratified scavenging is opened and closed by the piston that has passages and cutouts. The charge inlet to the crankcase chamber is opened and closed by the piston. The air and charge inlet passages are substantially asymmetrical to the layout of the transfer passages and are closer to one transfer passage compared to the other. The internal air passage in the piston is substantially perpendicular to the piston pin.

22 Claims, 6 Drawing Sheets

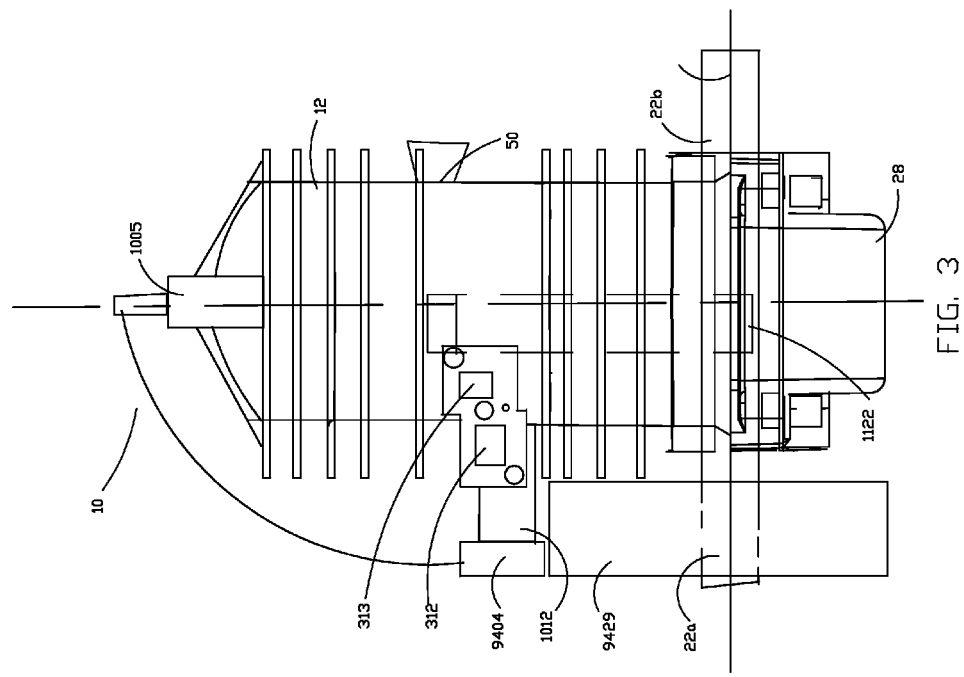
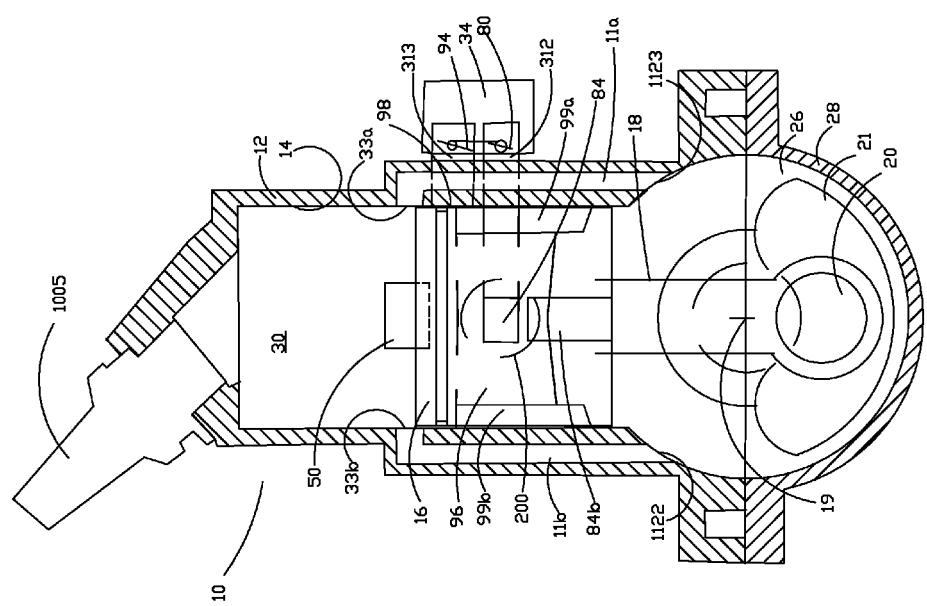

TWO-STROKE ENGINE

RELATED APPLICATIONS

The present application claims the benefit of priority of U.S. Provisional Patent application No. 61/276,584, filed Sep. 14, 2009, and entitled "PISTON AND CYLINDER FOR STRATIFIED TWO-STROKE ENGINES", the entirety of which is incorporated by reference herein for all purposes.

FIELD

Various embodiments relate to two stroke internal combustion engines. Various embodiments relate to two stroke internal engines with stratified scavenging.

Various embodiments may find application in two-stroke internal combustion engines. Some applications include a small high speed two stroke engine, such as utilized in hand-held power equipment such as leaf blowers, string trimmers, and hedge trimmers. Some applications include wheeled vehicle applications such as mopeds, motorcycles, scooters, and small outboard boat engines. The small two stroke engine has many desirable characteristics, including simplicity of construction, low cost of manufacturing, high power-to-weight ratios, high speed operational capability and, in many parts of the world, ease of maintenance.

BACKGROUND

Inherent drawbacks of two stroke engines are high emission levels and poor fuel economy due to short-circuit loss of fuel and air charge during the scavenging process. One drawback of the simple two-stroke engine is a loss of a portion of the fresh unburned fuel charge from the cylinder during the scavenging process. In the two-stroke engine, the homogeneous charge enters the cylinder through transfer ports during the scavenging process, when the exhaust port is also open. As such, some of the charge escapes through the exhaust port leading to high levels of hydrocarbons (HC) in the tailpipe. This leads to the poor fuel economy and high emission of unburned hydrocarbon, thus, rendering the simple two stroke engine difficult to comply with increasingly stringent governmental pollution restrictions. This drawback can be relieved by separating the scavenging of the cylinder, with fresh air, from the charging of the cylinder, with fuel. This separation can be achieved by having a buffer medium of air between the fresh charge and the burnt gas, during the scavenging process.

Several concepts and technologies have been proposed or tried to circumvent the short-circuit loss of fresh charge. Among these techniques are direct or indirect fuel injections, stratified scavenging, air-head, air assisted fuel injection, and compressed wave injection. Most of these technologies are either complex, expensive or need more parts. The fuel injection technology is not economical for small engines but air-head scavenging and stratified scavenging are promising.

Air-head scavenging systems disclosed in U.S. Pat. Nos. 4,821,787, 6,112,708, and 6,367,432 describe reed valve controlled air passages in air-head scavenged two-stroke engines. The use of reed valves increases the cost.

U.S. Pat. Nos. 7,363,888, 6,973,899, 7,025,021, 6,895,910, 6,289,856, and 6,497,204 describe piston controlled air head scavenging. However, the location of the ports with respect to the crankshaft do not meet the configuration necessary to have the exhaust port in line with the crankshaft as packaged by, for example, Echo brand chainsaw. Secondly the inlet of air requires dual ports to supply air to transfer passages on either side of the exhaust port.

U.S. Pat. No. 7,331,315, and Application 2006243230, describe a fuel injected stratified engine. However, there are several drawbacks of those fuel injection systems. First, one hundred percent of the air goes through the transfer passages during the induction process and the same transfer passages are then used to transfer the charge from the crankcase to the combustion chamber during the gas exchange process. Secondly, the transfer passage ports are likely to be very large and the fuel may stick to walls in transfer passages, at least during cold start, and some of it may be lost into exhaust, which increases HC emission.

It is desirable to have a simple two-stroke engine with fewer parts and that is easy to manufacture and assemble. It is also desirable to have a piston that can be die cast for low cost manufacturability.

In most engines, fuel is mixed with air using a simple carburetor. However, among the disadvantages of the carburetor systems are that they need a manual choke and do not compensate for variation in ambient and operating temperatures. Thus the fuel consumption is higher and hence brake specific emission is also higher. Also, the conventional carburetors in small engines have built in fuel pumps that depend on the pulsation of crankcase pressure. There are more advanced electronic fuel systems commonly used in automobiles and some small engines. For example U.S. Pat. Nos. 7,331,315, and 7,536,983, and PCT US2007/074982 describe electronic fuel injection systems for small two-stroke engines, which have fuel pumps that depend on engine pulses for pumping the fuel at a certain pressure, but can become unreliable as they entirely depend on crankcase pulses. For instance, the crankcase pulses could be affected by the blow down of burnt gases into the crankcase chamber and as such pulse pump could be unreliable. Some engines use electrical or mechanical pumps for delivering fuel at a higher pressure to the injector. Secondly they use gasoline as fuel. In U.S. Pat. No. 6,609,509 the fuel used is LPG (liquefied petroleum gas), however, the system is more of a carburetor type than electronically controlled injection system.

SUMMARY

An engine according to various embodiments includes a cylinder with at least one transfer passage that is a channel in the cylinder bore. The top end of the channel opens into the combustion chamber and the lower end opens into the crankcase chamber. The top end is opened and closed by the piston. As the piston is moving upward, the passage in the piston skirt opens the transfer port into the crankcase. The passage may be just a window in the piston or a special passage. Connection of transfer passage to air and crankcase is alternative and is accomplished by the cut out in the piston which also synchronizes with the air inlet port in the cylinder. The main charge inlet into the crankcase takes place in a usual manner either through the piston-controlled inlet, rotary valve, or a reed valve system. Only a piston controlled inlet is shown, as an example, in the illustrations, which illustrate exemplary embodiments. The piston may also have a cut out (84*b*), shown in FIG. 4, on the skirt to time the intake of charge. The cut out on the piston skirt for the charge is determined by the location of charge inlet port (second port) (84). If the charge inlet port is at a lower height than the air inlet port (98), then there is no need for the cut out.

In a quadruplet type transfer passage, the top end of the said passage is connected to the adjacent transfer passage either through a cut out in the piston or directly through a passage at the top between the pair of transfer passages. The quadruplet passage increases the total volume of air, which acts as a buffer medium in the transfer passages. It also helps clear the fresh charge in the transfer passages from the previous cycle. The amount of air getting into each of the passages may be distributed and controlled by the deflectors on the piston window.

The total length of the transfer passage may be increased by having the transfer passage continue into the crankcase as a groove on the crankcase wall.

In various embodiments, the air channel in the piston and the air and charge inlets are mostly in one quadrant. And the quadrant lies between the intake side and the flywheel side. However, the inlet ports (second port) (84), and (98) can be in any one of the quadrants as the case may be.

An engine according to various embodiments allows for easier casting of the piston than would be possible with other systems.

An engine according to various embodiments includes an intake port and an exhaust port that are both in line with the crankshaft. Various embodiments include an engine with an exhaust port and muffler. Having an exhaust port and exhaust muffler may advantageously reduce the width of the engine. For example, the exhaust muffler and discharge can be in the front toward the chain in a chainsaw application. For example, the exhaust muffler and discharge can be in the back of a trimmer engine, while the intake system (such as carburetor or throttle body with fuel injection) can be on the side for easy access by the user.

In various embodiments, having an exhaust port (third port) (50) in line with the piston pin (200) may provide for easy assembling of the piston pin (200) in a mono-block casting.

In an alternate fuel mixing system, the conventional carburetor 34 may be replaced by a dual (or a single) intake electronic LPG fuel (9101) injection throttle body 9400, where the charge inlet passage and air intake passages (312, 313) are respectively connected to the primary intake passage (9180) and secondary intake passage (9480) in the throttle body (9102) to connect to the crankcase chamber (26) through the intake port (second port)(84) in the cylinder block (12) and the air inlet port (98). The EFI throttle body (9400) having first and second valves (9432, 9162) may be incorporated to regulate mass flow into the air intake and charge intake passages (313, 312) respectively. The EFI throttle body (9400) may have an electronically controlled LPG fuel injector (9138), either in the throttle body 9102 or in the charge intake passage (312). The pressurized LPG fuel (9101) is supplied from an external pressure regulator (2917) that may be integral to the cylinder block (12). The LPG fuel (9101) is contained in a fuel tank (2007). The timing and amount of fuel (9101) injection is controlled by an ECU (9136), based on the received input signals, such as crank angle position from a crank angle position sensor (9412) through a wire harness (9114), the speed is measured through the same sensor or from the ignition pulses received by the ignition module (9404), intake temperature as measured by the sensor (9146), possibly cylinder block (12) temperature, and throttle position from the sensor (9142).

The advantages of LPG fuel injection as envisioned in various embodiments is that the fuel is already in gaseous form, and therefore the fuel does not condense on the walls of the transfer passages, secondly the fuel is already under pressure, therefore the fuel injection system described herein does not need a separate pump.

In various embodiments, a reed valve type air head engine can be used in conjunction with the oil injection into the charge passage to minimize the exhaust emission. In various embodiments, the fuel system can be either a dual passage carburetor or a dual passage fuel injection system. Such embodiments may be used in a gaseous fueled two-stroke engine. One advantage with reed valve type air head engine is that the simpler and conventional piston without cavity or air channel can be used, where in the air is admitted into the transfer passages through the reed valves as described in U.S. Pat. No. 6,112,708.

It will be appreciated that various embodiments described herein may be applicable to two stroke engines, to four stroke engines, and/or to any other type of engine.

BRIEF DESCRIPTION OF THE DRAWINGS

The foregoing aspects and other features are explained in the following description, taken in connection with the accompanying drawings where:

FIG. 2 is a longitudinal sectional view illustration of an exemplary embodiment of a two-stroke engine shown in FIG. 1.

FIG. 3 is a front view of an exemplary embodiment of a two-stroke engine showing locations of the air and charge inlets.

DETAILED DESCRIPTION

Figure 1:
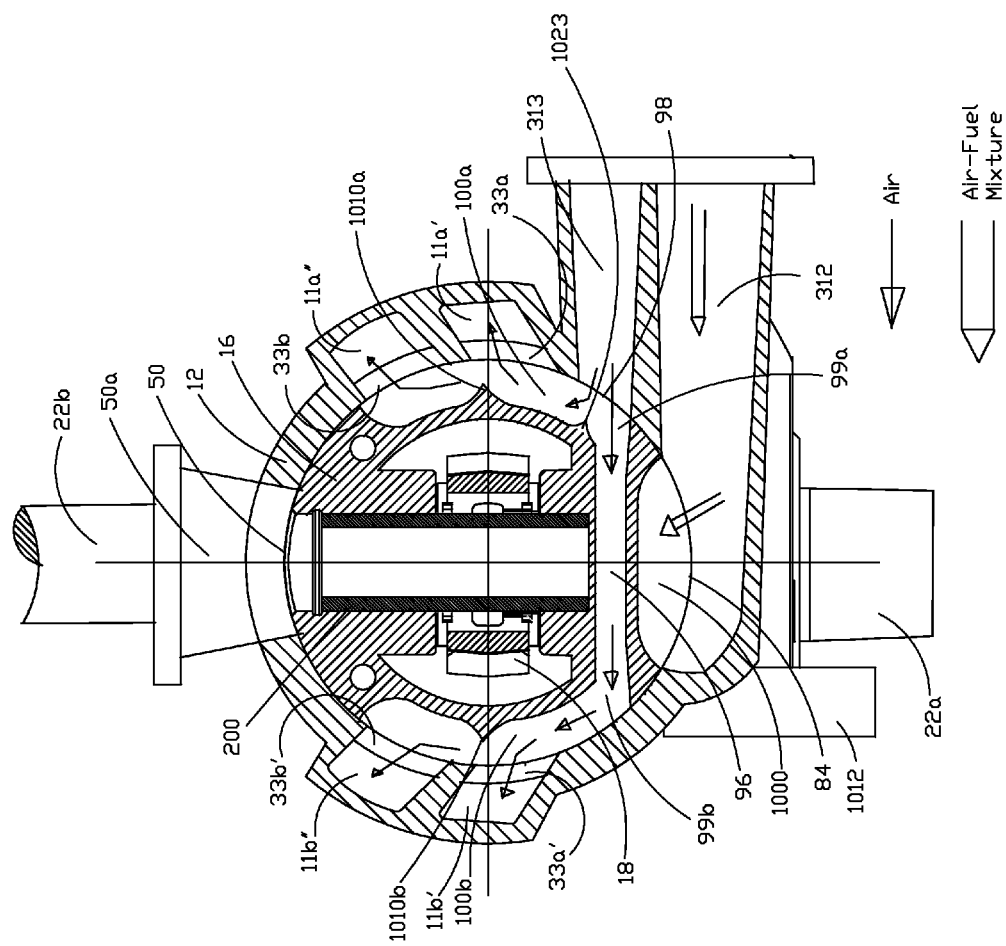
FIG. 1 is a horizontal sectional view illustration of an exemplary embodiment of a two-stroke engine with an air channel in the piston.

Various embodiments include a stratified charge two-stroke engine (10) including a cylinder block (12), charge inlet port (second port)(84) substantially in line with the crankshaft (22), air inlet port (98) almost parallel to the crankshaft (22)(in which the projection of the inlet port 98 is somewhat perpendicular to the axis of the crankshaft), piston (16) having an air channel (96) substantially perpendicular to the piston pin (200) and having piston windows (100a and 100B) almost in line with the piston pin (200) having deflector (1023) to divide the incoming air to two sides of the piston (16), air inlet passage (313) and charge inlet passage (312) being substantially perpendicular to the crankshaft (22). In some embodiments, the stratified charged two stroke engine has an electronic LPG fuel injection system (9400). In some embodiments, an LPG Electronic Fuel Injection System (9400) has a throttle body (9102), receives LPG fuel (9101) through an inlet (9110), has an integrally cast pressure chamber (9105) and fuel metering chamber (9116) through an internal fuel passage (9126) connected to an electronically controlled LPG injector (9138) (or an orifice as in a carburetor, where flow of fuel is regulated by the valve, as in a carburetor). Throttle body (9102) may have two butterfly throttle valves (which could also be of rotary or slide valves) (9162 and 9432) operating a throttle position sensor (9142) on an ECU (9136).

Illustrated in FIGS. 1-4 is an exemplary two stroke engine 10 having a cylinder block (12) that houses a cylinder bore (14). A piston (16) reciprocates within the cylinder bore (14) and is connected by means of a connecting rod 18 to a crank pin 20 on a crank web (21) of a crankshaft (22). The crankshaft (22) is journaled for rotation about a crankshaft axis (19) within a crankcase chamber (26) of a crankcase 28 that is affixed to the lower end of the cylinder block (12) in a suitable manner (the cylinder block (12) and the crankcase (28) may also be of mono-block type). A combustion chamber (30) is defined as a region within the cylinder bore (14) above the piston (16). The engine includes a two-way scavenging system including transfer passages (11a and 11b) between the crankcase chamber (26) and the combustion chamber (30). The transfer passages (11a and 11b) are used for scavenging and allowing a fresh fuel/air charge to be drawn from the crankcase chamber (26) into the combustion chamber 30 through the transfer ports (33a and 33b) in the cylinder block (12) at the completion of a power stroke.

A rich fuel/air mixture is inducted into the combustion chamber (30) of the cylinder bore (14) by a charge induction system (32) which includes a carburetor (34), charge inlet passage (312), charge inlet port (second port) (84). The charge inlet port (second port) (84) is opened and closed by the piston 16, which has inlet window (1000) cut out on the piston skirt. In some embodiments, it is possible not to have the cut out as in the case of a conventional engine. The fresh air inlet system consists of the induction system including the carburetor (34) having air control valve (94), air inlet passage (313), and air inlet port (98). The air inlet port (98) is opened and closed by the piston (16) which has the cut out (99), which has one window (100a) on the intake side and another window (100b) on the opposite side. The window (100a) aligns with the transfer port (33a) (and 33b) at the appropriate time, as the piston moves upward after closing the exhaust port (third port) (50). The window (100b) aligns with the transfer ports (33a') (33b') in the same manner and timing as the window (100) with the ports (33a) (and 33b). The piston windows (100a) and (100b) are in gaseous communication through the air channel (96) in the piston (16). The air channel (96) may be of different cross sectional area than the area of the cut out (99). The air channel (96) is substantially perpendicular to the crankshaft, but need not necessarily be perpendicular, in some embodiments. The charge inlet port (second port) (84) is substantially in line with the crankshaft, but need not necessary be so, in some embodiments. As illustrated in FIG. 1, the air channel (96) and the charge inlet through inlet port (second port) (84) appear to be at right angles to each other. Also, the projection of the air inlet port (98) and charge inlet port (second port) (84) are substantially at right angles in some embodiments. However, these need not necessarily be so, in some embodiments.

The windows (100a) and (100b) have deflectors (1010a) and (1010b) to deflect the air into the transfer ports (33a) and (33a'). There is also one deflector (1023) at the edge of the cut out (99a) to help deflect the incoming air into the window (100a) and may be designed to provide restriction for the flow of air into air channel (96).

The air-head scavenged engines provide a buffer medium of air between the fresh charge and the burned gas during the scavenging process. When the transfer ports open, the air enters the combustion chamber first and is most likely to be short-circuited, in the sense that a small fraction of air is lost into the exhaust. The air is inducted into the transfer passage during the intake process, when the piston is ascending. In the most common piston ported air-head engines, air and charge inlet are perpendicular to the crankshaft, while the exhaust port is perpendicular to the crankshaft and the transfer passages are on either side of exhaust port and mostly toward the crankshaft. However, in certain applications, such as the one used by Echo, the exhaust port is in line with the crankshaft and the intake port is from the flywheel side. This arrangement makes it difficult to adopt conventional piston porting for air-head scavenging.

In the exemplary embodiment the piston porting is designed to adapt air-head scavenging in a two-stroke engine where the exhaust can be in line or at any angle to the crankshaft. Secondly the inlet passages and ports for the air and charge can be almost parallel to each other in the plane perpendicular to the cylinder axis. But they can be at an angle too.

The two-stroke engine described in these embodiments consists of air inlet port, opened and closed by the window on the piston for gaseous communication between the air inlet port and the transfer ports at the top of the transfer passages. The air channel in the piston is for gaseous communication between piston window on one side of the piston to the piston window on the opposite side of the piston to supply air from air inlet to the transfer passages farther away from the air inlet port.

The air inlet port is in gaseous communication with lower end of the transfer passage at appropriate times only. The lower end of the transfer passage opens in to the crankcase chamber. The timing of the gaseous communication between the air inlet port and the transfer passage is controlled by the window in the piston. The air in the transfer passage acts as a buffer medium between the charge and the burnt gas to minimize the loss of charge into exhaust and thereby lowers the exhaust emission.

FIGS. 1 through 5 illustrate a quadruplet transfer passage type two-stroke engine, according to some embodiments; wherein there are four transfer passages (and ports) two on each side of the exhaust port (third port) (50). As the piston (16) moves upward, the exhaust port (third port) (50) is closed. Soon after the exhaust port is closed, the cut out (99a) aligns with the air inlet port (98) allowing the fresh air to flow into the engine from the ambient through the air inlet passage (313) and into the transfer passages (11a and 11b). The cut out (99) which is in gaseous communication with the windows (100a) and (100b) allows the air to flow into the transfer ports (33a and 33b) as the two windows now align with the transfer ports (33a and 33b) as the piston moves upward. Thus the air flows from the ambient into the transfer passages (11a and 11b) during the upward travel of the piston. Thus air in the transfer passage acts as a buffer medium during scavenging to minimize the loss of fresh charge. As the piston continues to move upward, the charge inlet port (second port) (84) is now opened by the piston skirt which may have a cut out (1000) (84b). Thus only an air-fuel mixture, called the charge, enters the crankcase chamber (26) directly. As the piston continues to move upward, it compresses the charge in the combustion chamber (30) for explosion and expansion of the burnt gases during the power stroke. The exhaust of burned gases occur as the piston moves downward and opens the exhaust port (third port) (50).

As the piston moves downward the air inlet port (98) and charge inlet port (second port) (84) are closed by the piston. As the piston continues to move down toward BDC, the exhaust port (third port) (50) is now open for exhausting the burned gases and a few degrees later the transfer ports (33a and 33b) are open for scavenging and filling processes. Since air is stored in the transfer passages, the air enters the combustion chamber (30) first and tends to escape with the burnt gas. The fresh charge follows the air and thus scavenging is accomplished.

Also, it should be noted that an electronic LPG fuel injection system may be used in place of a carburetor in some embodiments.

In various embodiments, an intake system may be one of a one-way valve type, or a rotary valve type. In the rotary intake system, the intake port (second port) (84) is in the crankcase (28) and the intake port (second port) (84) is opened and closed by a cut out in the crank web (21).

Figure 5:
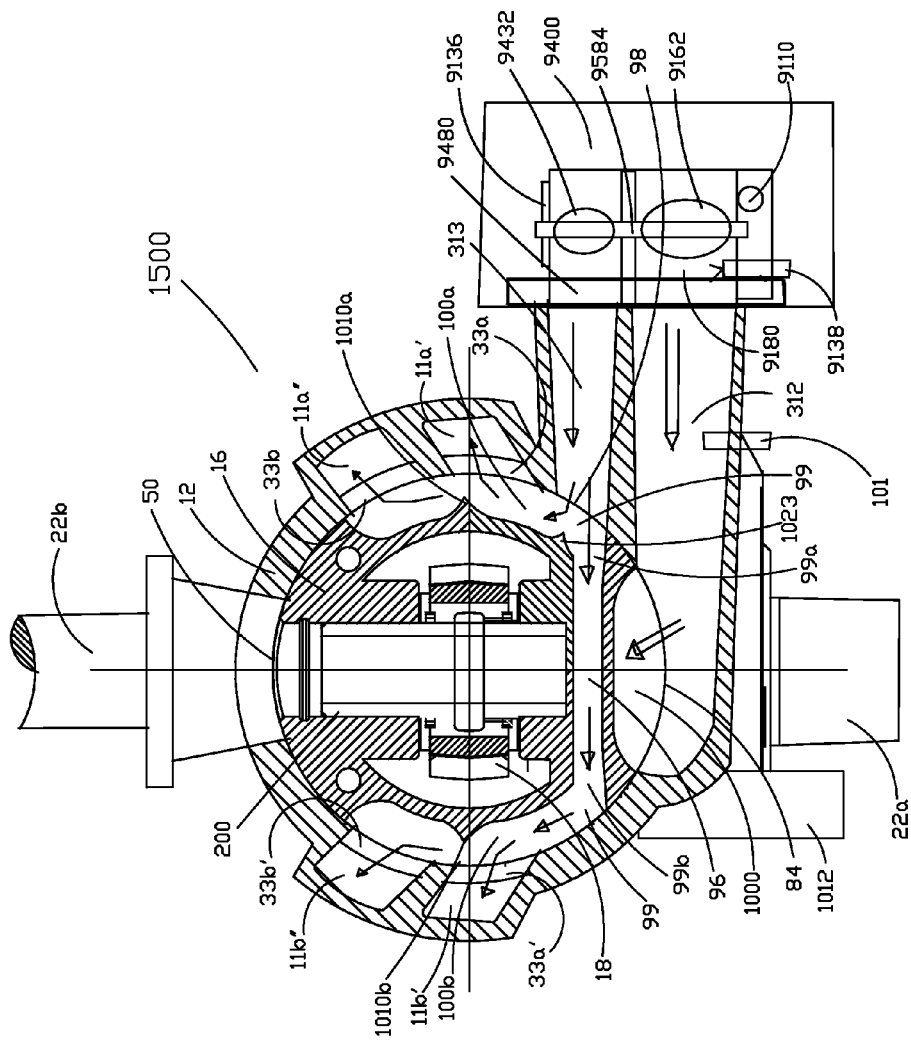
FIG. 5 is a longitudinal sectional view illustration of an exemplary embodiment of a two-stroke engine shown in FIG. 1 having an electronic LPG fuel injected throttle body.
Figure 4:
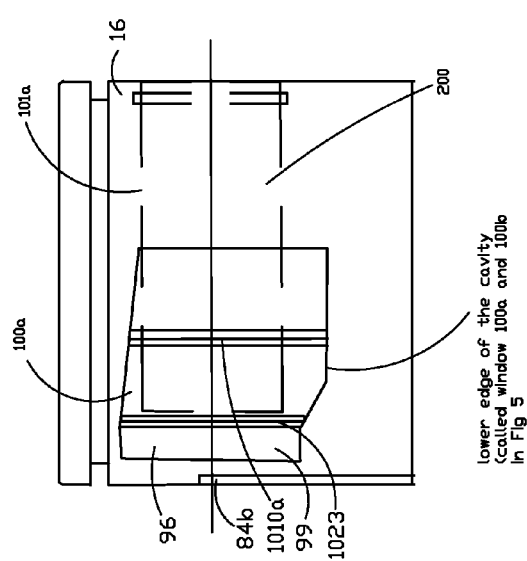
FIG. 4 is a view illustration of the piston showing air channel and the window, according to some embodiments.

FIG. 5 illustrates an engine (1500) which is similar to engine 10 illustrated in FIG. 2, but has an LPG electronic fuel injection (LPG EFI) system (9400) in place of the carburetor 34. The engine (1500) has the LPG EFI system (9400) to manage the delivery of gaseous fuel (9101) to the engine (1500). The amount of fuel and timing of the LPG fuel injection is controlled by an ECM (9142) mounted on the throttle body (9102). The LPG EFI system manages the fuel delivery based on inputs that the ECM 9138 receives from many sensors; throttle position sensor 9142 that indicates if the throttle is closed or open or any position in between idle and fully open position, the engine speed or the RPM is measured by the number of pulses the ignition module (9404) receives from the magnet on the flywheel (9429), the air intake temperature as measured by the sensor (9146), and possibly engine block temperature. These are very commonly used parameters in an EFI system commonly used in automobiles. The LPG fuel (9101) is supplied from the LPG tank (2007), which is normally at about 110 inches of water. The high pressure fuel is typically reduced to about 10 to 15 inches of water and may be even higher. The pressure regulator (2917) reduces the pressure. The LPG pressure regulator may also be an integral part of the throttle body (9400) as shown in FIG. 6.

The ignition module (9404) is mounted on boss (1012), and the magnets (not shown) are on the flywheel (9429), which energize coils in the ignition module. There may be additional power coil in the module to supply power to the ECM (9136). The flywheel (9429) is mounted on the crankshaft (22). The crankshaft (22) is used to drive many applications, such as trimmers, blowers, chainsaws, mopeds, lawn mowers, etc.

The engine (1500) may have oil injection as in the case of engine shown in FIG. 5. The LPG EFI may also be used to inject the LPG fuel directly into the crankcase chamber (26). The intake passage shown in FIG. 5, has an LPG fuel injector in the charge intake passage (312), while the oil is also injected into passage (312). In some embodiments, the oil may be injected into the air passage (313). In some embodiments, oil may be injected directly into the crank case chamber. An oil injector (101) according to some embodiments is illustrated in FIG. 5.

Figure 6:
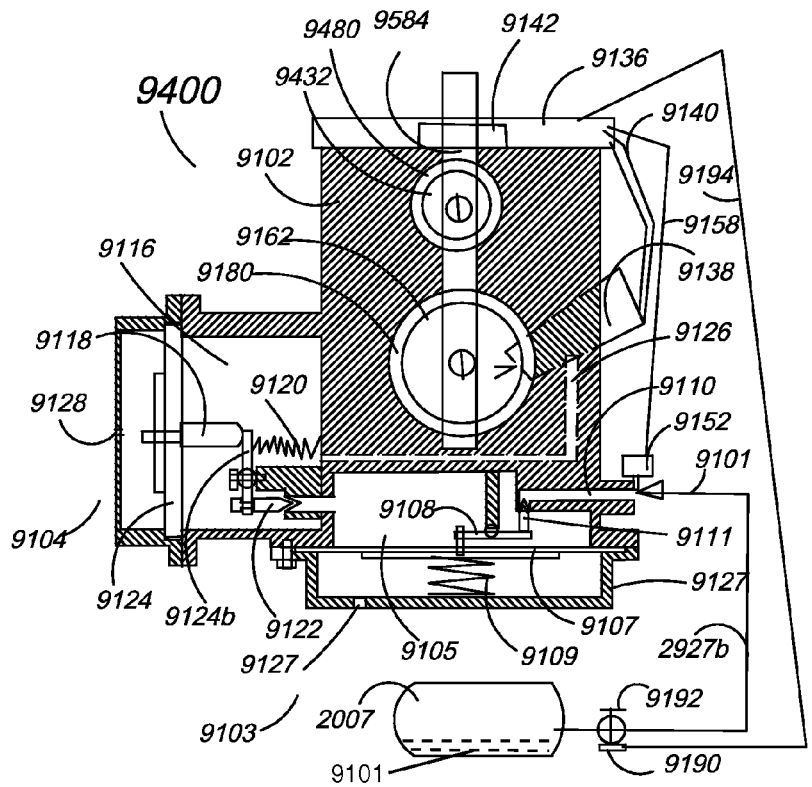
FIG. 6 is a cross sectional front view of an embodiment of an electronic LPG fuel injected throttle body with dual intake butterfly valves, fuel metering chamber, and fuel pressure regulator.
Figure 7:
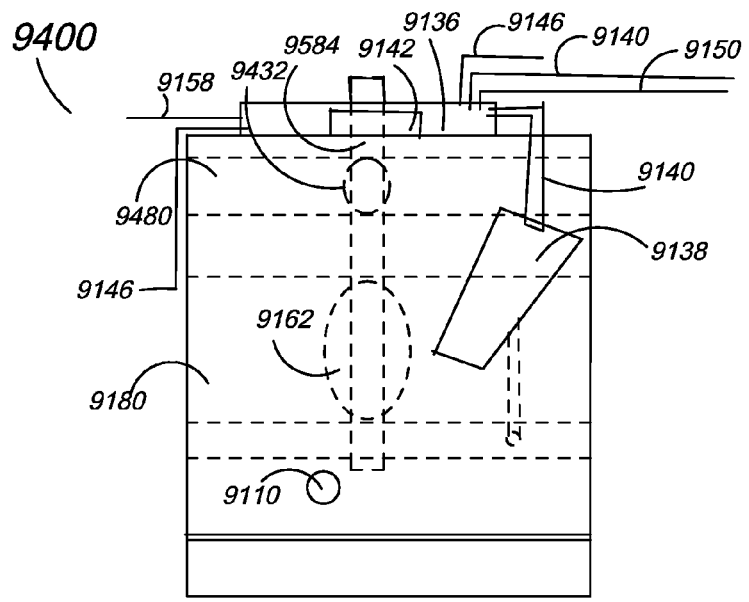
FIG. 7 is side view of FIG. 6.

FIGS. 6 and 7 illustrate embodiments of electronically controlled LPG or compressed natural gas injected throttle body as applied to small engines. The pressure in an LPG tank typically is about 100 inches of water and the pressure is reduced in regulator to about 10 inches of water. The LPG EFI system 9400 consists of a throttle body (9102) that has a primary intake passage (9180) that connects the engine's charge intake passage (312) shown in FIG. 5. The primary intake passage (9180) has a throttle valve (9162) which is a butterfly valve (or which could be a slide valve or a rotary valve) to regulate the amount of air going into the crankcase chamber (26). The throttle valves (which may also generally be referred to as control valves) (9162) and (9432) are controlled by the throttle shaft (9584) or it can be a rotary valve or a sliding valve as known in the art. In various embodiments, the control valves may be in a single body. In various embodiments, the control valves may be on separate bodies. In the latter case, the two separate bodies may be fastened together. The LPG EFI system (9400) has an electronic control unit (9136), commonly called an ECU or ECM mounted on the body (9102) such that the throttle shaft (9584) passes through the ECU (9136) which has a throttle position sensor (9142) to sense the position of the throttle, which can range from fully closed for low speed and load at idle, to fully open position at full speed or load. The ECU (9136) has inputs or sensors connected to it to measure engine speed (9148), engine block temperature or exhaust temperature (9150), intake air temperature (9146). The ECU (9136) has the fuel and timing maps to control the amount of LPG fuel (9102) injected through an injector 9138 and also the ECU (9136) can control the spark timing based on engine RPM and throttle position, which is a common practice.

In some embodiments, the electronic control unit (9136) may be mounted on or in close proximity to the injector (9138). As such, terminals (9140) may be short. In some embodiment, there may be no need for terminals (9140) as the electronic control unit may be in direct contact with the injector.

Throttle body (9102) has an integral pressure regulator (9103) consisting of an LPG fuel inlet (9110), pressure chamber (9105), diaphragm (9107), needle valve (9111), arm (9108), pressure spring (9109), vent hole (9129) in the pressure regulator cover (9127).

The pressure P1 is normally at about 50 to 100 inches of water in the LPG tank when the LPG fuel (9101) enters the pressure chamber (9105) where the flow is regulated by the needle valve (9111). The needle valve (9111) is connected to the diaphragm (9107) through a pin (9118) and an arm (9108). As the pressure increases in the chamber (9105) the needle valve closes the flow of LPG fuel because the pressure pushes the diaphragm (9107) outward against a pressure spring (9109). The pressure P2 in the pressure chamber (9105) is controlled by the spring (9109), which may be pre-set to any level equal to or below the inlet pressure P1. The fuel pressure chamber (9105) is connected to a fuel metering chamber (9104) through a passage (9176) between the pressure chamber (9105) and the fuel metering chamber (9116). The metering chamber (9116) is connected to the LPG fuel injector (9138) through a fuel passage (9126), which can also be an external hose outside the throttle body (9102). As the fuel flows into the fuel metering chamber (9116), the pressure P2 in the pressure chamber (9105) drops, thus opening the needle valve (9111) for the fuel to flow into the pressure chamber (9105), thus maintaining almost a constant pressure P2.

The fuel metering chamber (9116) also includes a diaphragm (9114), needle valve (9122), arm (9124), pin (9118), metering chamber cover (9130) and a vent hole (9128). Operation of the metering chamber (9116) is similar to the pressure chamber (9105), where the pressure P2 now at about 10 inches of water is maintained constant while the fuel is fed to the fuel injector (9138). LPG Fuel in the metering chamber (9116) is connected to the injector (9138) through a fuel passage (9126), as the fuel is depleted in the metering chamber (9116) due to LPG fuel injection into the passage (9180), the pressure P2 drops in the metering chamber. The needle (9122) opens and maintains a nearly constant pressure P2. The needle valve (9122) is activated by the diaphragm through the pin (9118) and the arm (9124). The needle valve tries to stay closed because of the spring (9120) in the metering chamber (9116). Typically this spring (9120) is a very small spring compared to the spring (9109). Pressure P2 in metering chamber (9116) is slightly lower than P2 due to pressure loss across the needle valve (9122).

The amount of LPG fuel (9101) injected depends on throttle position, intake temperature TI, engine block or exhaust gas temperature TB, engine speed RPM, and sometimes, intake manifold pressure MAP. In addition, a fuel inlet pressure or fuel pressure (P4) in the LPG supply line may be input to the ECM so as to adjust the on time of the fuel injector. Fuel supply pressure may be important when the fuel tank is almost empty and that a longer on time may be required to completely empty the fuel tank.

Typically, the EFI system requires a TDC or a crank angle sensor to determine when the injection should occur or spark should occur in a cycle. In a two-stroke engine, the spark occurs every rotation of the crankshaft and also fuel injection occurs every rotation of the crankshaft. Therefore, the fuel injection timing may be tied to the spark timing, with appropriate lag time for injection.

In FIG. 6, the fuel supply line (2927b) from the LPG fuel tank (2007) has a fuel shut off valve (9192) that also is an electrical kill switch to kill the running engine. This is a safety measure, where the operator shuts off the fuel when he turns the switch to kill the engine. The kill wires (9194) turns off the circuit in the ECU to kill the engine. For certain type of applications, it is necessary to have the engine kill switch on the handle. FIG. 6 also shows a fuel pressure sensor (9152) to sense the fuel pressure and may be input to the ECM (9136) to appropriately adjust the fuel on time. Where the on time is longest at lower pressures. This normally occurs when the fuel is almost empty in the LPG fuel tank. Sensor may be necessary since there is no fuel pump in this case.

Figure 9:
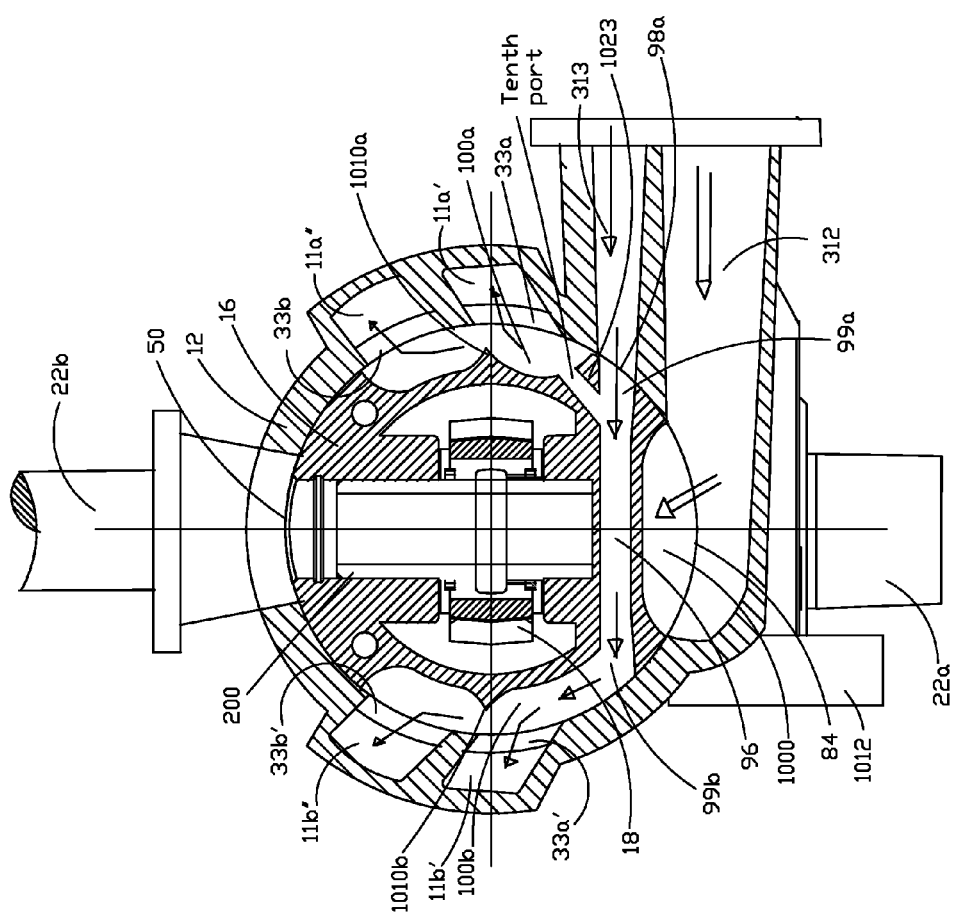
FIG. 9 is a view illustration of an engine according to some embodiments.

FIG. 9 illustrates an exemplary embodiment in which the air channel (96) includes two branches, with each branch feeding air to different transfer passages, e.g., to transfer passages on opposite sides of the pin (200). In some embodiments, the extra branch may take the place of a cutout along the edge of the piston, e.g., as shown in FIG. 1. As depicted, the terminus of one of the branches is referred to as a "tenth" port. It will be appreciated that, in various embodiments, air passage (96) may include two or more branches, or that there may be two or more air passages. It will be appreciated that in various embodiments, multiple branches and/or multiple passages may feed air to transfer passages either on the same or on opposite sides of pin (200).

In some embodiments, a reed valve is used to admit ambient air into a transfer passage, e.g., transfer passage (11b').

The following are embodiments, not claims:

Embodiment A

A two-stroke internal combustion engine comprising:
a. at least one transfer passage (11a) between a crankcase chamber (26) and a combustion chamber (30) of the engine; and
b. an air channel (100) in gaseous communication with a top portion of the at least one transfer passage (11a) and ambient through at least one air intake port (98).

Embodiment B

The two-stroke internal combustion engine of Embodiment A, further comprising:
a cylinder having a cylinder wall (14); and
a reciprocating piston (16) mounted within the cylinder, wherein the piston has a air channel (96) and a window (100a) that reciprocatingly establishes gaseous communication between the at least one transfer passage (11a) and the air inlet port (98).

Embodiment C

The two-stroke internal combustion engine of Embodiment B, wherein the piston further comprises an air channel (96) substantially perpendicular to the crankshaft (22).

Embodiment D

The two-stroke internal combustion engine of Embodiment A, wherein the charge inlet port (second port) (84) is substantially in line with the crankshaft (22).

Embodiment E

The two-stroke internal combustion engine of Embodiment A, wherein the exhaust port (third port) (50) is substantially in line with the crankshaft (22).

Embodiment F

An internal combustion engine as in Embodiment A further comprising:
a crankcase cover (28) covering a crankcase chamber (26) within the crankcase (28); and
a fuel tank (2007) operable for holding liquefied petroleum gas or another compressed gaseous fuel supplying fuel to the engine.

Embodiment G

An internal combustion engine as in Embodiment A further having: a fuel tank (2007) operable for holding liquefied petroleum gas (9101) or other compressed gaseous fuel for use in the engine, an LPG EFI system (9400) comprised of a throttle body (9102) with integral pressure chamber (9105) and LPG fuel metering chamber (9116), having an electronically controlled LPG fuel injector (9138), controlled by an ECM (9136), power supplied to ECM by coil in the ignition module (9404), throttle position sensor (9142) operated by the throttle shaft (9584).

Embodiment H

An internal combustion engine as in Embodiment G further having: a LPG fuel tank (2007) operable for holding liquefied petroleum gas (9101) or other compressed gaseous fuel for use in the engine, an LPG EFI system (9400) comprised of a throttle body (9102) with integral pressure chamber (9105) and LPG fuel metering chamber (9116), having an electronically controlled LPG fuel injector (9138) injecting into primary passage (9180), controlled by an ECM (9136), power supplied to ECM by coil in the ignition module (9404), throttle position sensor (9142) operated by the throttle shaft (9584) having dual throttle valves (9162 and 9432) one (9432) exclusively for controlling the amount of air only and the other (9432) for controlling the amount of charge (Air plus LPG Fuel or gaseous fuel).

Embodiment I

An internal combustion engine as in embodiment A further having an LPG electronic fuel injection system (9400) comprising an ECM (9136) to:
a. control the timing and on time of the injector (9138) with reference to spark timing or crank angle position;
b. control the spark timing and trigger the spark;
c. control the fuel injection duration;

d. receive the crank location signal from ignition coil (9404);
e. receive fuel pressure signal from the pressure sensor (9152);
f. adjust the injection duration based on the input from throttle position sensor, engine speed (RPM), temperatures;
g. adjust the injection duration based on fuel pressure;
h. determine the stroke of the cycle based on spark interval at starting;
i. determine the start of injection timing based on signal received from the ignition coil (9404); and
j. to receive power from the ignition coil (9404).

Embodiment J

The two-stroke internal combustion engine of Embodiment A, wherein the oil is injected into the charge inlet passage (312) and air induction into air inlet passage 313 is substantially free of any fuel.

Embodiment K

The two-stroke internal combustion engine of Embodiment I, wherein the fuel injected is LPG fuel.

Embodiment L

The two-stroke internal combustion engine of Embodiment I, wherein the fuel injected is gaseous fuel.

Embodiment M

The two-stroke internal combustion engine of Embodiment I, wherein the fuel is substantially free of any lubricating oil.

Embodiment N

The two-stroke internal combustion engine of Embodiment I, wherein the fuel is pre-mixed with oil.

Embodiment O

The two-stroke internal combustion engine of Embodiment A, wherein the charge inlet port (second port) (84) is in the crankcase (28) (not shown in any FIG.).

MORE EMBODIMENTS

Embodiments

The following are embodiments, not claims:
Various embodiments include an engine with one transfer passage that is opposite an air intake port. A passageway through the piston may connect the air intake port to the transfer passage, thereby putting the two in gaseous communication, at least some of the time.

A. An engine (10) comprising:
a) a hollow crankcase (28);
b) a hollow cylinder (12) opening at one end into the opening of crankcase, the cylinder including:
   at least one first port (98) for the admission of air;
   a second port (84) for the admission of a mixture of air and fuel; and
   a third port (third port) (50) for the expulsion of exhaust gasses;
c) a piston (16) situated within the cylinder (12), in which:
   the piston (16) is free to move up and down along an axial dimension of the cylinder (12); and
   the piston (16) substantially fills a cross-sectional area of the cylinder (12) so as to substantially divide the volume of the cylinder into a combustion chamber (30) on one side of the piston and a crankcase chamber (26) on the other side of the piston;
d) a piston pin (200) that is attached to the piston (16), in which the long axis of the pin lies substantially perpendicular to the direction of motion of the piston;
e) a crankshaft (22) extending through the crank case (28);
f) a crank web (21) attached at its center to the crankshaft;
g) a connecting rod (18), in which one end of the connecting rod is attached to the piston pin (200) and the other end of the connecting rod (18) is attached to the crank pin (20) on the crank web (21); and
h) an ignition source (1005) operable to supply ignition to the combustion chamber (30),
in which the engine translates up and down motion of the piston (16) into a circular motion of the crankshaft (22) via the intermediation of connecting rod (18) and crank web (21);
in which the cylinder includes at least one first transfer passage (11b') with at least one fourth port (33a') opening into the combustion chamber (30), and at least one fifth port (1122) opening into the crankcase chamber (26);
in which the piston (16) includes at least one first passageway (96) through its interior with a sixth port (99a) opening to one side of the long axis of the piston pin (200) and a seventh port (99b) opening to the other side of the long axis of the piston pin, such that at a given position of the piston (16), the sixth port (99a) interfaces to the first port (98) and the seventh port (99b) interfaces to the fourth port (33a'); and
in which the first passageway (96) is substantially perpendicular to the piston pin (200).

AAXX. An engine (20) comprising:
a) a hollow crankcase (28) having a second port (84) in the crankcase;
b) a hollow cylinder (12) opening at one end into the opening of crankcase, the cylinder including:
   at least one first port (98) for the admission of air; and
   a third port (third port) (50) for the expulsion of exhaust gasses;
c) a piston (16) situated within the cylinder (12), in which:
   the piston (16) is free to move up and down along an axial dimension of the cylinder (12); and
   the piston (16) substantially fills a cross-sectional area of the cylinder (12) so as to substantially divide the volume of the cylinder into a combustion chamber (30) on one side of the piston and a crankcase chamber (26) on the other side of the piston;
d) a piston pin (200) that is attached to the piston (16), in which the long axis of the pin lies substantially perpendicular to the direction of motion of the piston;
e) a crankshaft (22) extending through the crank case (28);
f) a crank web (21) attached at one of its ends to the crankshaft;
g) a connecting rod (18), in which one end of the connecting rod is attached to the piston pin (200) and the other end of the connecting rod (18) is attached to the crank pin (20) on the crank web (21); and
h) an ignition source (1005) operable to supply ignition to the combustion chamber (30), in which the engine translates up and down motion of the piston (16) into a circular motion of the crankshaft (22) via the intermediation of connecting rod (18) and crank web (21);

in which the cylinder includes at least one first transfer passage (11b') with at least one fourth port (33a') opening into the combustion chamber (30), and at least one fifth port (1122) opening into the crankcase chamber (26);

k) in which the piston (16) includes at least one first passageway (96) with a sixth port (99a) opening to one side of the long axis of the piston pin (200) and a seventh port (99b) opening to the other side of the long axis of the piston pin, such that at a given position of the piston (16), the sixth port (99a) interfaces to the first port (98) and the seventh port (99b) interfaces to the fourth port (33a'); and (l) in which the first and third ports are situated such that the direction of flow of air through the first port, and the direction of flow of exhaust gas through the third port are substantially perpendicular.

AA. An engine (20) comprising:
a) a hollow crankcase (28) having a second port (84) in the crankcase;
b) a hollow cylinder (12) opening at one end into the opening of crankcase, the cylinder including:
   at least one first port (98) for the admission of air; and
   a third port (50) for the expulsion of exhaust gasses;
c) a piston (16) situated within the cylinder (12), in which:
   the piston (16) is free to move up and down along an axial dimension of the cylinder (12); and
   the piston (16) substantially fills a cross-sectional area of the cylinder (12) so as to substantially divide the volume of the cylinder into a combustion chamber (30) on one side of the piston and a crankcase chamber (26) on the other side of the piston;
d) a piston pin (200) that is attached to the piston (16), in which the long axis of the pin lies substantially perpendicular to the direction of motion of the piston;
e) a crankshaft (22) extending through the crank case (28);
f) a crank web (21) attached at one of its ends to the crankshaft;
g) a connecting rod (18), in which one end of the connecting rod is attached to the piston pin (200) and the other end of the connecting rod (18) is attached to the crank pin (20) on the crank web (21); and
h) an ignition source (1005) operable to supply ignition to the combustion chamber (30), in which the engine translates up and down motion of the piston (16) into a circular motion of the crankshaft (22) via the intermediation of connecting rod (18) and crank web (21);

in which the cylinder includes at least one first transfer passage (11b') with at least one fourth port (33a') opening into the combustion chamber (30), and at least one fifth port (1122) opening into the crankcase chamber (26);

k) in which the piston (16) includes at least one first passageway (96) through its interior with a sixth port (99a) opening to one side of the long axis of the piston pin (200) and a seventh port (99b) opening to the other side of the long axis of the piston pin, such that at a given position of the piston (16), the sixth port (99a) interfaces to the first port (98) and the seventh port (99b) interfaces to the fourth port (33a'); and l) in which the first passageway (96) is substantially perpendicular to the piston pin (200).

A.l The engine (10) of embodiment A in which the at least one first passageway (96) includes two separate passageways through the interior of the piston, each interfacing at one end to the first port (98) and at the other end to the fourth port (33a').

A.k The engine (10) of embodiment A in which:
the first passageway (96) is substantially perpendicular to the piston pin (200); and
the third port (50) lies along a radial line of the cylinder (12) that is substantially parallel to the long axis of the piston pin (200).

A.k.1 The engine (10) of embodiment A further comprising a second passageway (313) for feeding air into the first port (98), in which the second passageway (313) is substantially perpendicular to the piston pin (200).

A.k.1.1 The engine (10) of embodiment A.k.1 in which the first port (98) and the third port (50) are more than 90 degrees apart with respect to the arc of the cylinder.

The engine (10) of embodiment A.k.1 in which the first port (98) and the third port (50) are more than substantially perpendicular with respect to the direction of flow of air and exhaust gas respectively.

A.k.1.1 The engine (10) of embodiment A.k.1 in which the first and third ports are situated such that the direction of flow of air through the first port, and the direction of flow of exhaust gas through the third port are substantially perpendicular.

A.k.1.2 The engine (10) of embodiment A.k.1 in which the first port (98) and the third port (50) are less than 90 degrees apart with respect to the arc of the cylinder.

A.k.2 The engine (10) of embodiment A in which the first port 98 and the second port 84 both lie in the same quadrant of the cylinder (12), where such quadrant is defined by a first radial boundary parallel to the long axis of the piston pin (200) and crossing the first passageway 96, and a second radial boundary perpendicular to the long axis of the pin (200).

A.k.2' The engine (10) of embodiment A in which the first port 98 and the second port 84 both lie at least partially in the same quadrant of the cylinder (12), where such quadrant is defined by a first radial boundary parallel to the long axis of the piston pin (200) and crossing the first passageway 96, and a second radial boundary perpendicular to the long axis of the pin (200).

A.0 The engine (10) of embodiment A in which the first passageway (96) facilitates the admission of air into the transfer passage (11b').

A.1 The engine (10) of embodiment A in which the first passageway (96) is substantially perpendicular to the long axis of the piston pin (200).

A.1.1 The engine of embodiment A in which the first passageway (96) is substantially perpendicular to the axis along which the piston (16) is free to move.

Various embodiments include engines with more than one transfer passage, e.g., with two transfer passages.

A.2 The engine (10) of embodiment A further including a second transfer passage (11a') with an eighth port (33a) opening into the combustion chamber (30) and a ninth port (1123) opening into the crankcase chamber (26).

Various embodiments include engines with more than two transfer passages, e.g., four transfer passages.

A.2.0 The engine (10) of embodiment A.2 further including a third transfer passage 11a" and a fourth transfer passage 11b", each with openings into the combustion chamber (30) and the crankcase chamber (26).

A.2.1 The engine of embodiment A.2 in which the eighth port (33a) is on the opposite side of the long axis of the pin as is the fourth port.

A.2.1.1 The engine of embodiment A.2 in which the eighth port (33a) is on the right side of the long axis of the pin, while the fourth port (33a') is on the left side of the long axis of the pin.

In various embodiments, a piston may include a cavity (e.g., cavity 100a) that connects the air intake to the second transfer passage (e.g., to the transfer passage on the near side of the piston).

A.2.2 The engine of embodiment A.2 in which the piston (16) includes a cavity (window 100a) that is connected to the first passageway (98), and that, for a given position of the piston (16), interfaces to the eighth port (33a).

A.2.2.1 The engine of embodiment A.2.2 in which the piston (16) includes a deflector (1023) that directs airflow from the first port (98) into two streams flowing, respectively, towards the fourth and eighth ports.

In various embodiments, rather than a cavity, another passageway, or e.g., a branched passageway, may connect the air intake to the second transfer passage.

A.2.3 The engine (10) of embodiment A.2 in which the first passageway (96) includes a tenth port and in which, for a given position of the pin, the tenth port interfaces to the eighth port.

A.2.3.1 The engine of embodiment A.2.3 in which the first passageway is branched with one branch terminating at the seventh port and the other branch terminating at the eighth port.

In various embodiments, where a passageway through the piston is branched, a deflector may redirect some or all air to ensure the air goes down both of the branches of the passageway.

A.2.3.2 The engine of embodiment A.2.3 in which the first passageway includes a deflector that directs air flow to the tenth port.

A.2.3.3 The engine of embodiment A.2.3 in which the first passageway includes a deflector that divides air flow entering from the first (98) port into two streams flowing, respectively, towards the seventh (99b) and tenth ports.

A.2.3.4 The engine of embodiment A.2.3 in which the first passageway (96) includes a deflector that divides air flow entering from the first port (98) into two substantially equal air streams flowing, respectively, towards the seventh and tenth ports.

In some embodiments passageways 312 and 313 are substantially perpendicular to the exhaust passage (50a), that is to the direction of flow of exhaust gas.

A.x The engine (10) of embodiment A further comprising:
l) a second passageway (313) for feeding air into the first port (98);
m) a third passageway (312) for feeding a mixture of air and fuel into the second port (84); and
n) an exhaust passage (50a),
in which the both the second and third passageways are substantially perpendicular to the exhaust passage (50a).

A.x.1 The engine (10) of embodiment A.x in which the first port (98) and the second port (84) lie less than 90 degrees from one another along the arc of the cylinder (12).

A.x.1.1 The engine (10) of embodiment A.x.1 in which the first port (98) and the second port (84) both lie more than 90 degrees from the third port when measured along the arc of the cylinder (12).

A.x.2 The engine (10) of embodiment A.x in further including an oil injector (101) for injecting oil into the third passageway (312).

A.t The engine (10) of embodiment A in which fuel is not pre-mixed with oil.

Figure 8:
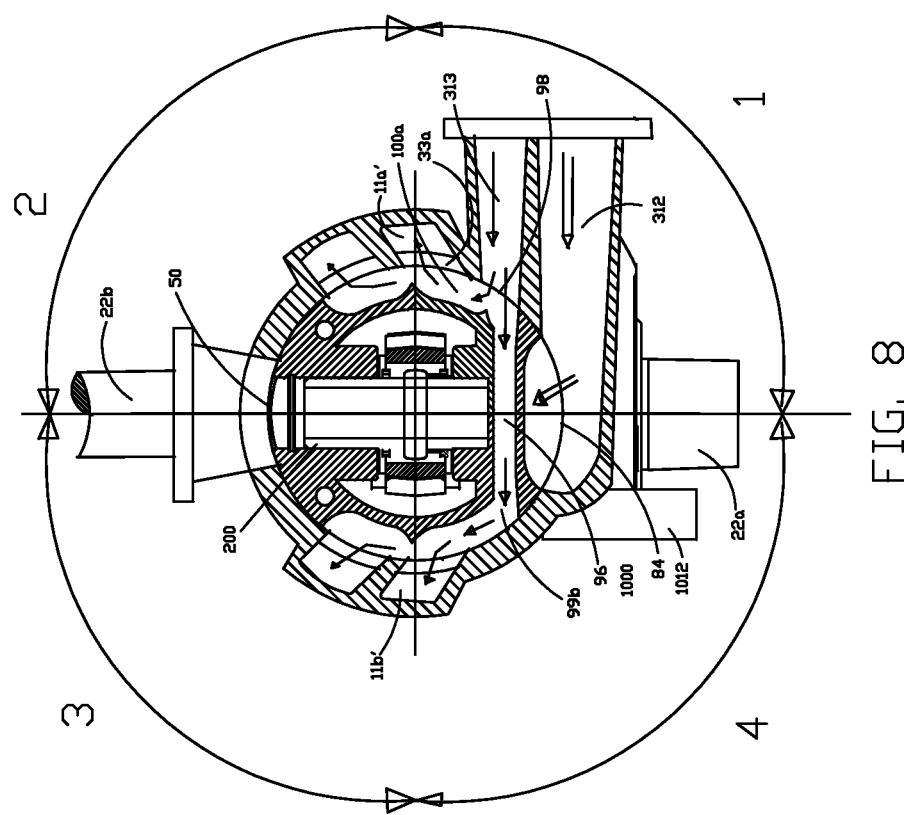
FIG. 8 is a view illustration of the engine embodiment shown in FIG. 1 showing the quadrants of the engine.

In some embodiments, ports 98 and 84 are in the quadrant 1, between ports 33a and 33a'. An exemplary illustration of a division of an engine into notional quadrants is shown in FIG. 8.

A.y The engine (10) of embodiment A further comprising:
l) a second passageway (313) for feeding air into the first port (98);
m) a third passageway (312) for feeding a mixture of air and fuel into the second port (84),
in which the first port (98) and the second port (84) both lie in the same quadrant of the cylinder (12), where such quadrant is defined by a first radial boundary parallel to the long axis of the piston pin (200) and crossing the first passageway 96, and a second radial boundary perpendicular to the long axis of the pin (200).

A.y' The engine (10) of embodiment A further comprising:
l) a second passageway (313) for feeding air into the first port (98);
m) a third passageway (312) for feeding a mixture of air and fuel into the second port (84),
in which the first port (98) and the second port (84) both lie at least partially in the same quadrant of the cylinder (12), where such quadrant is defined by a first radial boundary parallel to the long axis of the piston pin (200) and crossing the first passageway 96, and a second radial boundary perpendicular to the long axis of the pin (200), and
in which the second port (84) lies partially to either side of a radial line of cylinder (12) that is parallel to the long axis of the piston pin (200).

A.z The engine (10) of embodiment A in which the first port (98) and the second port (84) both lie in the same quadrant of the cylinder (12), where such quadrant is defined by a first radial boundary parallel to the long axis of the piston pin (200) and crossing the first passageway 96, and a second radial boundary perpendicular to the long axis of the piston pin (200).

In various embodiments, an engine may include a metering apparatus, such as a carburetor.

A.3 The engine of embodiment A further comprising:
a) a metering apparatus;
b) a second passageway (9480) for transporting air from the metering device to the first port (98); and
c) a third passageway (9180) for transporting gaseous fuel from the metering device to the second port (84)

F. A metering apparatus (9400 in FIGS. 5, 6, and 7) comprising:
a) a first passageway (9480) for transporting air to a first port (98) of an engine;
b) a second passageway (9180) for transporting gaseous fuel to a second port (84) of the engine;
c) at least one pressure chamber;
d) a metering chamber;
e) fuel is free of any oil; and
f) fuel is gaseous fuel.

J. A two-stroke engine comprising:
a) a hollow crankcase (28) including one opening;
b) a hollow cylinder (12) opening at one end into the opening of crankcase, the cylinder including:
at least one port (98) for the admission of air;
a second port (84) for the admission of a mixture of air and fuel; and
a third port (50) for the expulsion of exhaust gasses;

c) a piston (16) situated within the cylinder (12), in which:
the piston (16) is free to move up and down along an axial dimension of the cylinder (12); and
the piston (16) substantially fills a cross-sectional area of the cylinder (12) so as to substantially divide the volume of the cylinder into a combustion chamber (30) on one side of the piston and a crankcase chamber (26) on the other side of the piston;
d) a piston pin (200) that is attached to the piston (16), in which the long axis of the pin lies substantially perpendicular to the direction of motion of the piston;
e) a crankshaft (22) extending through the crank case (28);
f) a crank web attached at one of its ends to the crankshaft;
g) a connecting rod (18), in which one end of the connecting rod is attached to the piston pin (200) and the other end of the connecting rod (18) is attached to the crank pin (20) on the crank web (21); and
h) an ignition source (1005) operable to supply ignition to the combustion chamber (30),
in which the engine translates up and down motion of the piston (16) into a circular motion of the crankshaft (22) via the intermediation of connecting rod (18) and crank web;
in which the cylinder includes at least one first transfer passage (11b') with a fourth port (33a') opening into the combustion chamber (30), and a fifth port (1122) opening into the crankcase chamber (26);
in which the fuel is not pre-mixed with fuel; and
in which oil is injected separately to lubricate the internal parts of the engine.

In various embodiments, an engine may include a metering apparatus, such as a carburetor.

A.3. A metering apparatus (9400 in FIGS. 5, 6, and 7) comprising:
a) a metering apparatus;
b) a second passageway (9480) for transporting air from the metering device to the first port (98);
c) a third passageway (9180) for transporting gaseous fuel from the metering device to the second port (84); and
F. A metering apparatus (9400 in FIGS. 5, 6, and 7) comprising:
a) a first passageway (9480) for transporting air to a first port (98) of an engine;
b) a second passageway (9180) for transporting gaseous fuel to a second port (84) of the engine;
c) at least one pressure chamber;
d) at least one metering chamber; and
e) a fuel injector (9138) injecting gaseous fuel into second passageway (9180).
F". A metering apparatus (9400 in FIGS. 5, 6, and 7) comprising:
a) a first passageway (9480) for transporting air to a first port (98) of an engine;
b) a second passageway (9180) for transporting gaseous fuel to a second port (84) of the engine; and
c) at least one pressure chamber,
in which the fuel is a gaseous fuel and is free of any oil.
F'. A metering apparatus (9400 in FIGS. 5, 6, and 7) comprising:
a) a first passageway (9480) for transporting air to a second third passageway (313) of an engine;
b) a second passageway (9180) for transporting gaseous fuel to a third fourth passageway (312) of the engine;
c) a pressure chamber; and
d) a metering chamber.
F.1 The metering apparatus (9400) of embodiment F in which the metering apparatus is a carburetor.

F.2 The metering apparatus (9400) of embodiment F in which the metering apparatus is an electronic fuel injection system.
F.2.1 The metering apparatus (9400) of embodiment F in which the metering apparatus comprises:
a) at least one pressure regulator (9103);
F.4 The metering apparatus (9400) of embodiment F in which the gaseous fuel is one of: (a) liquefied petroleum gas; (b) propane; (c) gaseous fuel consisting of methane gas; (d) hydrogen; (e) landfill gas; and (f) natural gas.

A metering apparatus according to various embodiments may have air and air-fuel controlling valves (9432 and 9162)

F.5 The metering apparatus of embodiment F further comprising:
a) a first control valve (9432) for controlling flow of air into the first passageway; and
b) a second control valve (9162) for controlling flow of an air-fuel mixture into the second passageway.

In various embodiments, valves may be either butterfly valves, sliding valves, or rotating valves.

F.5.1 The metering apparatus of embodiment F.5 in which each of the first and second control valves are one of: (a) butterfly valves; (b) sliding valves; and (c) rotary valves.
F.5.1' The metering apparatus of embodiment F.5 in which each of the first and second control valves are a combination of: (a) butterfly valves; (b) sliding valves; and (c) rotary valves.
F.5.2 The metering apparatus of embodiment F.5 in which the first control valve and the second control valve are on a shaft (9584).
F.5.3 The metering apparatus of embodiment F.5 in which the first control valve is on a first shaft and the second control valve is on a second shaft, in which the first shaft is different than the second shaft.

In various embodiments, shafts may have a phase difference between them. In some embodiments, the air valve may lag behind air-fuel valve.

F.5.3.1 The metering apparatus of embodiment F.5.3 in which each of the first and second control valves opens and closes periodically at substantially the same frequency, but in which the first control valve lags the second control valve.
F.5.4 The metering apparatus of embodiment F.5 in which the first control valve and the second control valve are in a single body.
F.5.5 The metering apparatus of embodiment F.5 in which the first control valve is on a first body and the second control valve is on a second body.
F.5.6 The metering apparatus of embodiment F.2 further comprising an electronic control unit, in which the electronic control unit is operable to:
a) monitor a first state of an engine;
b) set a second state of the first control valve based on the first state; and
c) set a third state of the second control valve based on the first state.
F.5.6.0 The metering apparatus of embodiment F.5.6, in which, in monitoring the first state of the engine, the metering apparatus is operable to monitor one or more of: (a) engine speed; (b) temperature; (c) throttle position; (d) fuel pressure; (e) engine temperature; (f) ambient temperature; and (g) spark timing.
F.5.6.1 The metering apparatus of embodiment F.5.6, in which the electronic control unit is further operable to monitor a position of a throttle (9400) of the metering apparatus, and in which the electronic control unit is operable to set the second and third states based on a throttle position.

In various embodiments, the air passage and air-fuel passages may be in an integrally cast body.

F.6 The metering apparatus of embodiment F in which the first passageway and the second passageway are passageways through an integrally cast body.

E. A metering apparatus comprising a single body, the single body including:
  a) a first passageway (9480) for the transport of air;
  b) a second passageway (9180) for the transport of an air-fuel mixture;
  c) at least one pressure regulator; and
  d) a metering chamber,
  in which the fuel is not pre-mixed with oil; and the fuel is a gaseous fuel.

In various embodiments, a fuel metering apparatus may have air and air-fuel passages (9480 and 9180) and an oil injector (101), which may inject oil into the air-fuel passage (312).

H. A metering apparatus comprising:
  a) a first passageway (9480) for the transport of air;
  b) a second passageway (9180) for the transport of an air-fuel mixture; and
  c) an oil injector (101) for injecting oil in the second passageway.

In various embodiments, a fuel metering apparatus may have air and air-fuel passages (9480 and 9180) and an oil injector (101), which may inject oil into the air passage (313).

G. A metering apparatus comprising:
  a) a first passageway (9480) for the transport of air;
  b) a second passageway (9180) for the transport of an air-fuel mixture; and
  c) an oil injector (101) for injecting oil in the first passageway.

D. An apparatus comprising:
  a) a two-stroke engine with a first port for admitting air and a second port for admitting fuel;
  b) a metering apparatus, the metering apparatus operable to generate a gaseous fuel mixture;
  c) a first passageway for transporting air from the metering device to the first port;
  d) a second passageway for transporting the gaseous fuel mixture from the metering device to the second port; and
  e) an oil injector (101) for injecting oil in the first passageway.

I. A metering apparatus comprising:
  a) a throttle body (9102)
  b) a first passageway for admitting air;
  c) a second passageway for admitting gaseous fuel;
  d) an electronic control unit (9136) mounted on the throttle body (9102); and
  e) a gaseous fuel injector 9138 in the throttle body (9102).

I.1 The metering apparatus of embodiment I in which the apparatus does not have a metering chamber and does not have a pressure chamber.

Various embodiments have been described in an illustrative manner. It is to be understood that the terminology which has been used is intended to be in the nature of words of description rather than of limitation. While there have been described herein, exemplary embodiments, other modifications shall be apparent to those skilled in the art from the teachings herein and, it is, therefore, desired to be secured in the appended claims all such modifications as fall within the true spirit and scope of the described and contemplated embodiments.

The invention claimed is:

1. An engine comprising: a) a hollow crankcase; b) a hollow cylinder opening at one end into the opening of crankcase, the cylinder including: at least one first port for the admission of air; a second port for the admission of a mixture of air and fuel; and a third port for the expulsion of exhaust gases; c) a piston situated within the cylinder, in which: the piston is free to move up and down along an axial dimension of the cylinder; and the piston substantially fills a cross-sectional area of the cylinder so as to substantially divide the volume of the cylinder into a combustion chamber on one side of the piston and a crankcase chamber on the other side of the piston; d) a piston pin that is attached to the piston, in which the long axis of the pin lies substantially perpendicular to the direction of motion of the piston; e) a crankshaft extending through the crank case; f) a crank web attached at its center to the crankshaft; g) a connecting rod, in which one end of the connecting rod is attached to the piston pin and the other end of the connecting rod is attached to a crank pin on the crank web; and h) an ignition source operable to supply ignition to the combustion chamber, in which the engine translates up and down motion of the piston into a circular motion of the crankshaft via the intermediation of connecting rod and crank web; in which the cylinder includes at least one first transfer passage with at least one fourth port opening into the combustion chamber, and at least one fifth port opening into the crankcase chamber; in which the piston includes at least one tunnel defining a completely interior surface throughout the piston with a sixth port opening to one side of the long axis of the piston pin and a seventh port opening to the other side of the long axis of the piston pin, such that at a given position of the piston, the sixth port interfaces to the first port and the seventh port interfaces to the fourth port; and in which the first passageway is substantially perpendicular to the piston pin.

2. The engine of claim 1 in which:
  the first passageway is substantially perpendicular to the piston pin; and
  the third port lies along a radial line of the cylinder that is substantially parallel to the long axis of the piston pin.

3. The engine of claim 1 in which the first and third ports are situated such that the direction of flow of air through the first port, and the direction of flow of exhaust gas through the third port are substantially perpendicular.

4. The engine of claim 1 in which the first port and the second port both lie at least partially in the same quadrant of the cylinder, where such quadrant is defined by a first radial boundary parallel to the long axis of the piston pin and crossing the first passageway, and a second radial boundary perpendicular to the long axis of the pin.

5. The engine of claim 1 further including a second transfer passage with an eighth port opening into the combustion chamber and a ninth port opening into the crankcase chamber.

6. The engine of claim 5 further including a third transfer passage and a fourth transfer passage, each with openings into the combustion chamber and the crankcase chamber.

7. The engine of claim 5 in which the eighth port is on the opposite side of the long axis of the pin as is the fourth port.

8. The engine of claim 5 in which the eighth port is on the right side of the long axis of the pin, while the fourth port is on the left side of the long axis of the pin.

9. The engine of claim 5 in which the piston includes a cavity (window) that is connected to the first passageway, and that, for a given position of the piston interfaces to the eighth port.

10. The engine of claim 9 in which the piston includes a deflector that directs airflow from the first port into two streams flowing, respectively, towards the fourth and eighth ports.

11. The engine of claim 5 in which the first passageway includes a tenth port and in which, for a given position of the pin, the tenth port interfaces to the eighth port.

12. The engine of claim 11 in which the first passageway is branched with one branch terminating at the seventh port and the other branch terminating at the eighth port.

13. The engine of claim 11 in which the first passageway includes a deflector that directs air flow to the tenth port.

14. The engine of claim 11 in which the first passageway includes a deflector that divides air flow entering from the first port into two streams flowing, respectively, towards the seventh and tenth ports.

15. The engine of claim 11 in which the first passageway includes a deflector that divides air flow entering from the first port into two substantially equal air streams flowing, respectively, towards the seventh and tenth ports.

16. The engine of claim 1 further comprising:
l) a second passageway for feeding air into the first port;
m) a third passageway for feeding a mixture of air and fuel into the second port; and
n) an exhaust passage,
in which the both the second and third passageways are substantially perpendicular to the exhaust passage.

17. The engine of claim 16 in further including an oil injector for injecting oil into the third passageway.

18. The engine of claim 1 in which fuel is not pre-mixed with oil.

19. The engine of claim 1 further comprising:
l) a second passageway for feeding air into the first port;
m) a third passageway for feeding a mixture of air and fuel into the second port,
in which the first port and the second port both lie in the same quadrant of the cylinder, where such quadrant is defined by a first radial boundary parallel to the long axis of the piston pin and crossing the first passageway, and a second radial boundary perpendicular to the long axis of the pin.

20. The engine of claim 1 further comprising:
l) a second passageway for feeding air into the first port;
m) a third passageway for feeding a mixture of air and fuel into the second port,
in which the first port and the second port both lie at least partially in the same quadrant of the cylinder, where such quadrant is defined by a first radial boundary parallel to the long axis of the piston pin and crossing the first passageway, and a second radial boundary perpendicular to the long axis of the pin, and
in which the second port lies partially to either side of a radial line of cylinder that is parallel to the long axis of the piston pin.

21. The engine of claim 1 in which the first port and the second port both lie in the same quadrant of the cylinder, where such quadrant is defined by a first radial boundary parallel to the long axis of the piston pin and crossing the first passageway, and a second radial boundary perpendicular to the long axis of the piston pin.

22. The engine of claim 1 further comprising:
a) a metering apparatus;
b) a second passageway for transporting air from the metering device to the first port; and
c) a third passageway for transporting gaseous fuel from the metering device to the second port.

* * * * *